United States Patent [19]
Nowell et al.

[11] 3,929,715
[45] Dec. 30, 1975

[54] AN OIL-BASED EDPM POLYMER COMPOSITION IN THE FORM OF A CASTABLE JELLY AND METHOD OF USING SAME

[75] Inventors: Roger Nowell; Philip Edward Russell Tate, both of Swindon, England

[73] Assignee: Burmah Oil Trading Limited, Swindon, England

[22] Filed: Dec. 6, 1974

[21] Appl. No.: 530,609

Related U.S. Application Data

[63] Continuation-in-part of Ser. No. 514,748, Oct. 15, 1974, abandoned, which is a continuation of Ser. No. 367,173, June 5, 1973, abandoned.

[30] Foreign Application Priority Data
June 8, 1972 United Kingdom............... 26852/72

[52] U.S. Cl.......................... 260/33.6 AQ; 260/34.2
[51] Int. Cl.²............................................ C08K 5/01
[58] Field of Search.................... 260/33.6 AQ, 34.2

[56] References Cited
UNITED STATES PATENTS
3,794,611    2/1974    Brice............................ 260/33.6 AQ

*Primary Examiner*—Donald E. Czaja
*Assistant Examiner*—H. H. Fletcher
*Attorney, Agent, or Firm*—Bacon & Thomas

[57] ABSTRACT

An oil based composition in the form of a readily handleable castable jelly comprises a substantially homogeneous blend of from 85 to 95 percent by weight of a mineral oil extender and from 5 to 15 percent by weight of a thermoelastic copolymer of ethylene, propylene and a diene monomer having an ethylene content between 60 and 90 percent by weight, a propylene content between 10 and 35 percent by weight and having a crystallinity of at least 12 percent. The composition may be used as the source of all or a part of the oil employed in the preparation of an oil containing polymer formulation for use in making, for example, cellular elastomeric material.

11 Claims, 2 Drawing Figures

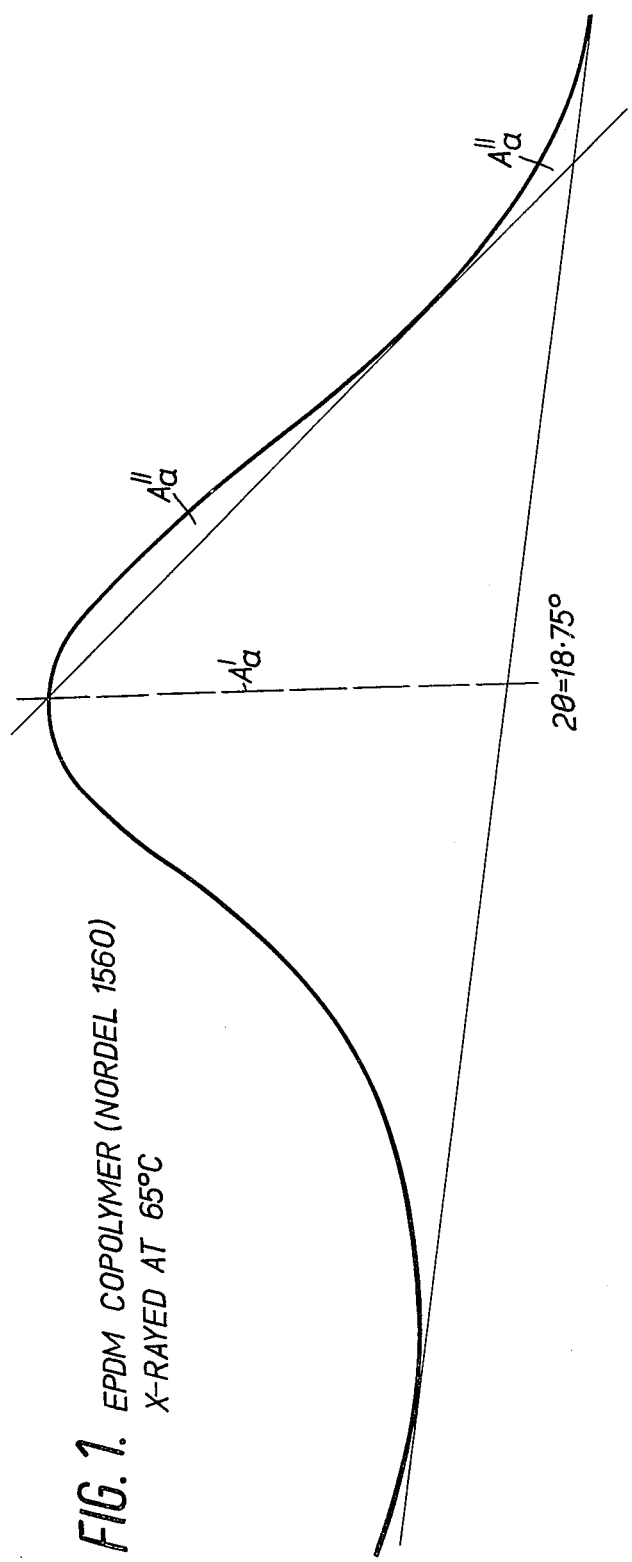
FIG. 1. EPDM COPOLYMER (NORDEL 1560) X-RAYED AT 65°C
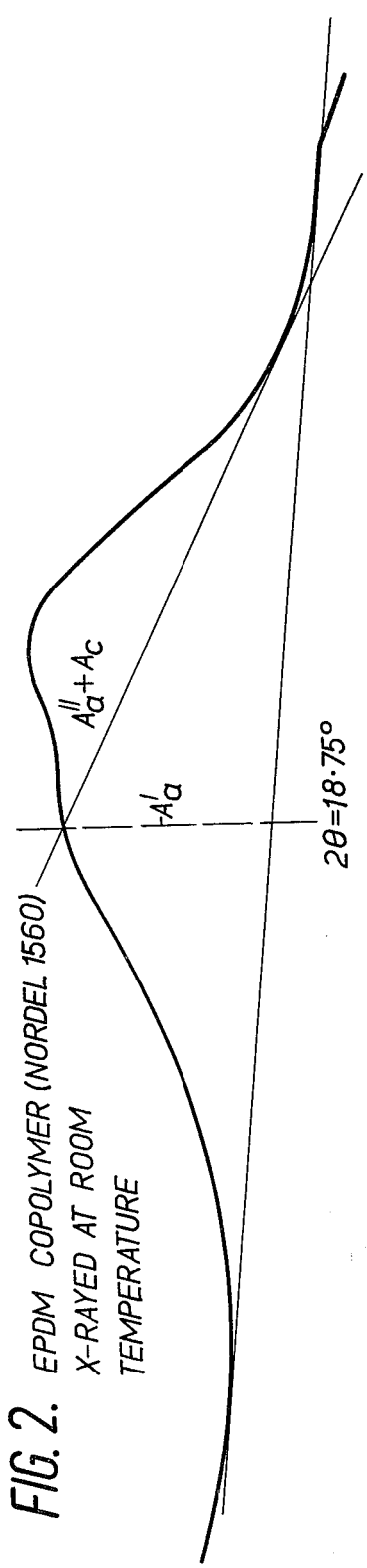
FIG. 2. EPDM COPOLYMER (NORDEL 1560) X-RAYED AT ROOM TEMPERATURE

AN OIL-BASED EDPM POLYMER COMPOSITION IN THE FORM OF A CASTABLE JELLY AND METHOD OF USING SAME

This application is a continuation-in-part of application Ser. No. 514,748, filed Oct. 15, 1974, now abandoned, which is a continuation of application Ser. No. 367,173, filed June 5, 1973 and now abandoned.

The present invention relates to an oil based composition which may be used as the source of all or a part of the oil employed in the preparation of an oil containing polymer formulation for use in making, for example, cellular elastomeric material.

Frequently, polymeric formulations, particularly those based on copolymers of ethylene, propylene and a diene monomer, commonly known as EPDM copolymers, incorporate large quantities of oil, for instance, as a low cost extender or for controlling the physical properties of the final product prepared from such formulation. During mixing of the ingredients of the polymer formulation the oil present acts as a lubricant thus reducing the shear build up within the polymer mass and resulting in poor dispersion through the polymer of the compounding ingredients to be incorporated as powders. This problem of poor dispersion is aggravated in practice by poor mixing conditions such as low rotor speeds, worn rotors and low ram pressures which are often encountered with older machinery. Previous attempts at improving the dispersion of ingredients have involved the costly step of increasing the duration of the mixing cycle.

More recently, it has been suggested in U.S. Pat. No. 3,794,611 to Brice that mixing times in producing oil-extended rubbers may be decreased by employing a two-stage mixing process involving (A) preparing a premix comprising from 5 to 15 percent by weight of rubber and from 95 to 85 percent by weight of extender oil and (B) mixing the premix of rubber and oil from Stage A with a large amount of additional rubber to form an oil-extended rubber. The main drawback in the Brice process is that the premixes of rubber and oil are highly viscous, tacky liquids which are difficult to handle, particularly in regard to measuring out quantities of such material. Brice envisages either pumping the rubber-extender oil premix, heated if necessary to an elevated temperature, thus requiring additional capital equipment or packaging the premix in plastic bags. With regard to the latter alternative, the plastic bags cannot be cut open because of the tacky, viscous nature of the premix and thus in the compounding process the amounts of other ingredients have to be calculated around the number of bags of premix used.

It is an object of this invention to provide a readily handleable polymer-extender oil premix in the form of a castable jelly which may be used as the source of all or a part of the oil required in the preparation of an oil containing polymer formulation.

Accordingly, the present invention provides an oil based composition in the form of a castable jelly comprising a substantially homogeneous blend of from 85 to 95 percent by weight of a mineral oil extender and from 5 to 15 percent by weight of a thermoelastic copolymer of ethylene, propylene and a diene monomer having an ethylene content between 60 and 90 percent by weight, a propylene content between 10 and 35 percent by weight and having a crystallinity of at least 12 percent.

The values for crystallinity will be further understood from the following description and accompanying drawings in which:

FIG. 1 is a graphical construction used to analyze densitometer traces corresponding to totally amorphous EPDM copolymer.

FIG. 2 is a graphical construction similar to FIG. 1 used to analyze densitometer traces corresponding to semi-crystalline EPDM copolymer.

The values quoted in this specification and the appended claims for the percentage crystallinities of EPDM copolymers refer to X-ray diffraction measurements obtained by the following test method:

Method used for X-ray crystallinity determination in EPDM copolymers

1. Samples of EPDM copolymers under test are pressed at 150°C to form sheets approximately 0.5 mm. thick. The sheets are cooled to room temperature under pressure (cooling time 15–20 minutes), then stored at room temperature for 1 week.

2. Pressed sheets are X-rayed using a Jeol 2KW X-ray generator fitted with a flat plate camera (using Ni filtered Cu K$\alpha$ radiation, 30 K$\nu$, 30m A, exposure time 7 minutes). High density polyethylene sheet, of similar thickness to the EPDM samples, is used to obtain an accurate value for the plate to sample distance (see (4)). This distance is selected so that the 110 diffraction ring of polyethylene (Bragg angle $2\theta = 21.4°$) is as large as possible, while still permitting back-ground intensity to be recorded outside it on the photographic film. This film (Ilford Industrial G) is developed under standard conditions.

3. Densitometer traces are obtained from the photographic films using a Joyce-Loebl Chromoscan microdensitometer in the transmission mode.

4. For EPDM copolymers, considerable overlap occurs between the amorphous and crystalline diffraction maxima and the two peaks must be resolved in order to measure the degree of crystallinity. Thus, densitometer traces must be obtained both for amorphous and crystalline samples of each EPDM copolymer.

Samples heated to 65° are photographed to obtain traces corresponding to totally amorphous material. The construction used to analyse these traces is shown in FIG. 1. A baseline is drawn across the peak as shown, and a tangent to the curve on the high angle side is drawn from the point corresponding to $2\theta = 18.75°$, the amorphous maximum, which is located using the equation $\tan 2\theta = R/L$ to calculate R, the radius of the diffraction ring. L is the sample to film distance obtained using a polyethylene film, for calibration purposes.

Using the method described for amorphous samples it has been found that:

$A_a'' = 6.6\% \ A_a'$ where $A_a'$ and $A_a''$ are areas shown in FIG. 1.

The same construction is used to analyse densitometer traces from semi-crystalline samples. (FIG. 2). Area $A_a'$ and the total area $A_t$ are measured. Then, "amorphous area" $A_a = (1+0.066) A_a'$
"crystalline area" $A_c = A_t - (1+0.066) A_a'$ $$\% \text{ crystallinity} = \frac{A_c}{A_c + 0.816 \ A_a}$$

(e.g. for sample shown in FIG. 2, % crystallinity was 23 percent.)

The foregoing method of calculating crystallinity is essentially that of Preedy (J. E. Preedy, Br. Polym. J. 5 13 (1973)) except that the 200 crystalline diffraction ring of polyethylene was not used as this is too weak to be detected in low crystallinity materials such as EPDM copolymers.

The lower limit of crystallinity for EPDM copolymers used in the compositions of the invention is 12 percent but the upper limit is difficult to define because at some indeterminate stage the polymer will change from a thermoelastic to a thermoplastic polymer. However, for most practical purposes the upper limit of crystallinity will be about 25 percent but may be higher e.g. 27 percent, a preferred range being from 17 to 25 percent.

The EPDM copolymers used in the compositions of the invention are high green strength grades which, besides having a crystallinity of at least 12 percent, have an ethylene content between 60 and 90 percent by weight and a propylene content between 10 and 35 percent by weight. No satisfactory method of determining the precise ethylene/propylene ratio of such materials is known and manufacturers are reluctant to give precise figures but it is preferred that the propylene content should be below 25 percent and that the ethylene content should be above 75 percent. The third component of the EPDM copolymer, namely, a diene monomer, may be selected from any of the dienes conventionally used, such as hexadiene, dicyclopentadiene, methylene norbornene, ethylidene norbornene and methyl tetrahydroindene.

As to its tensile properties, the EPDM copolymer should preferably have a modulus greater than 150 p.s.i., more preferably greater than 200 p.s.i., at 100 percent elongation and preferably an elongation less than 1000 percent, more preferably less than 600 percent, at 600 p.s.i. modulus.

The mineral oil extender employed in the compositions of the present invention may be any of the mineral oils conventionally used for extending EPDM copolymers. Generally these are obtained from a petroleum source and can be paraffinic, naphthenic or aromatic in character.

The compositions of the invention are readily handleable castable jellies which do not flow under their own weight at normal room temperatures. Preferably, however, the jellies should have a Drop Point, as measured according to ASTM D 566-64 (the same method also being described in IP 132/65), of at least 50°C, more preferably at least 70°C. Also, it is preferred that the jellies should have penetration values at 23°C, as measured according to ASTM D-217, of less than 300, more preferably less than 200, the practical lower limit being of the order of 10 using a high viscosity oil and a highly crystalline EPDM copolymer.

The invention also includes a process for the preparation of the above defined oil based composition which process comprises stirring a mixture of the oil extender and thermoelastic polymer at a temperature of between 90°C and 140°C, preferably between 110°C and 120°C, until a homogeneous blend is obtained.

Oil based compositions in accordance with the invention may, as stated above, be used as the source of all or a part of the oil employed in the preparation of oil containing polymer formulations. In addition, whereas it is often the case in making polymer formulations that dispersion of powdered ingredients through the polymer may be improved if such ingredients are initially formed into a pre-dispersion with a suitable binder, usually a process oil, prior to addition to the polymer, it has now found that even better dispersion may be obtained if an oil based composition in accordance with the invention is used as the source of all or a part of the oil employed as binder in the preparation of such pre-dispersions.

Thus in another aspect the invention includes a method of preparing oil containing polymer formulations and predispersions for polymer compounding, which method comprises using an oil based composition as defined above as the source of all or a part of the oil required. Also within the scope of the invention are oil containing polymer formulations and pre-dispersions prepared by the foregoing method.

It will be understood that typical polymer formulations and pre-dispersions in accordance with the invention may contain, for example, conventional reinforcing fillers and compounding ingredients such as antioxidants, activators, accelerators and vulcanizing agents.

The description which follows is included only for the purpose of illustrating the present invention and its distinction over the prior art and is not intended to limit the invention in any respect.

In order to examine the suitability of different EPDM copolymers as base polymer for oil based compositions in accordance with the invention, test compositions were prepared from a range of commercially available EPDM copolymers. The compositions were prepared in each case by mixing, at a temperature of 120°C, 10 parts by weight of the particular EPDM copolymer and 90 parts by weight of Poly-X N155, a commercially available naphthenic process oil. The mixing conditions and the properties of the compositions so prepared are shown in Table 1.

TABLE 1

| | | EPDM Copolymer/Oil Compositions* | | | | |
|---|---|---|---|---|---|---|
| Source | Polymer | Mixing Time hrs. | Mixing Temp. °C | Penetration at 23°C | Drop Point °C | Additional Comments |
| Du Pont Ltd. | Nordel 1500 | 2.5 | 120 | 270 | 93 | Rigid, tough jelly |
| | 1560 | 1.5–2.5 | 120 | 150 | 72 | Rigid, tough jelly |
| | 2722 | 3 | 120 | 265 | — | Soft jelly |
| | 2744 | 3 | 120 | 205 | — | Soft jelly |
| | 1145 | 3 | 120 | Off scale | — | Very tacky and fluid |
| | 1660 | 3 | 120 | Off scale | — | Very tacky and fluid |
| I.S.R. | Intolan 255 | 3 | 120 | Off scale | 38 | Tacky, fluid |
| | 260 | 3 | 120 | 170 | 84 | Tough jelly |
| Esso | Vistolan 3708 | 3 | 120 | 300 | — | Tacky, mobile fluid |
| Dutch State Mines | Keltan 778 | 3 | 120 | Off scale | 57 | Very tacky and fluid |
| Uniroyal | Royalene 1812 | 5 | 120 | 260 | — | Soft, tacky fluid |

*10 p.b.w. EPDM/90 p.b.w. Poly-X N155

The crystallinities, as measured by X-ray diffraction, of the particular EPDM copolymers examined as base polymer are recorded in Table 2. Also, various other physical properties of these materials are recorded in Table 3.

The EPDM copolymers listed in Table 2 having crystallinities greater than 12 percent are all high green strength grades containing between 60 and 90 percent of ethylene and between 10 and 35 percent of propylene and are thus within the definition of EPDM copolymers for use in compositions in accordance with the invention. It is observed from Table 1 that all of the EPDM copolymers having crystallinities below 12 percent produced oil compositions which were tacky fluids whereas surprisingly the EPDM copolymers having crystallinities greater than 12 percent all formed readily handleable jellies. In particular Nordel 1500 and Nordel 1560 both formed tough rigid materials ideally suited for use in the compounding of oil extended polymers, permitting relative proportions of all compounding ingredients to be accurately gauged and not requiring expensive peripheral handling equipment.

TABLE 2

EPDM Copolymers-Crystallinities (X-ray diffraction)

| Polymer | % Crystallinity |
| --- | --- |
| Nordel 1560 | 23.5 |
| Nordel 1500 | 15.0 |
| Intolan 260 | 17.5 |
| Nordel 2722 | 16.8 |
| Nordel 2744 | 12.9 |
| Royalene 1812 | 7.5 |
| Vistolan 3708 | 6.8 |
| Intolan 255 | 5.3 |
| Keltan 778 | 1.9 |
| Nordel 1145 | Negligible |
| Nordel 1660 | Negligible |
| Royalene 502 | Negligible |

TABLE 3

EPDM Copolymers - Physical Properties

| Polymer | Mooney Viscosity ML 1+8 (100°C) | IRHD Hardness | Tear Strength lbs | Tear Strength Newtons | Tensile Strength p.s.i. | Tensile Strength MNm$^{-2}$ | Modulus 100% Elong p.s.i. | Modulus 100% Elong MNm$^{-2}$ | Modulus 300% Elong p.s.i. | Modulus 300% Elong MNm$^{-2}$ | Elong at Break % |
| --- | --- | --- | --- | --- | --- | --- | --- | --- | --- | --- | --- |
| Nordel 1500 | 77 | 65 | 15.4 | 68.5 | — | — | 262 | 1.8 | 371 | 2.6 | — |
| Nordel 1560 | 78 | 72 | 16.6 | 74 | — | — | 255 | 1.75 | 340.5 | 2.35 | — |
| Nordel 1660 | 78 | — | 2.7 | 12 | 18 | 0.124 | — | — | — | — | 75 |
| Nordel 1145 | 67 | — | 2.5 | 11 | 35.5 | 0.245 | — | — | — | — | 62.5 |
| Nordel 2722 | — | 60 | 11 | 49 | 618 | 4.25 | 195 | 1.34 | 258.5 | 1.8 | — |
| Nordel 2744 | 68 | 67.5 | 13.75 | 61 | — | — | 154 | 1.1 | 242.5 | 1.7 | — |
| Vistolan 3708 | 72 | 56 | 12.5 | 55 | — | — | 177 | 1.2 | 263 | 1.8 | — |
| Intolan 260 | 56 | 75.5 | 14.7 | 65.3 | — | — | 248.5 | 1.7 | 356.5 | 2.45 | — |
| Intolan 255 | 83 | 56.5 | 10 | 44.4 | 411.5 | 2.8 | 122 | 0.84 | 177 | 1.2 | 1,028 |
| Keltan 778 | 78 | 42 | 8.6 | 38 | — | — | 96 | 0.66 | 142 | 1.0 | — |
| Royalene 502 | 63 | 64 | 4.4 | 19.5 | 100 | 0.7 | 79.5 | 0.55 | 93 | 0.64 | 610 |
| Royalene 1812 | 72 | 70 | 13.1 | 58 | — | — | 157.5 | 1.1 | 245 | 1.7 | — |

A direct comparison with Example II of U.S. Pat. No. 3,794,611 is unfortunately not possible since Nordel 729 as used in the particular composition described therein is no longer available. However, Nordel 729 was one of a series of development materials produced in the development of Nordel 1660 which is currently available and which has been included in the present study. It is noted from Table 2 that Nordel 1660 is an amorphous grade of EPDM, having negligible crystallinity, and it is believed that the material has a relatively low ethylene content (probably no greater than 55 percent). As expected from the teaching of U.S. Pat. No. 3,794,611, it is noted from Table 1 that the oil composition prepared from Nordel 1660 was a very tacky fluid, which would present significant handling difficulties in a polymer compounding process.

A further surprising advantage possessed by oil based compositions in accordance with the present invention, at least in the preferred embodiments thereof, is that lower mixing times are required for producing a homogeneous blend. This effect is particularly apparent in the case of Nordel 1500 and Nordel 1560.

The following examples are given by way of illustration and are not intended to limit the invention in any respect.

EXAMPLE 1

90 parts by weight of POLY-XN155, a commercially available naphthenic process oil, were heated to 90°C. and 10 parts by weight of granular Nordel 1500, a high green strength E.P.D.M. added with vigorous stirring. As the shear increased, the temperature was increased to 110°C. until a clear homogeneous fluid was formed. The fluid was cast into shallow trays where it set into a rubbery jelly.

In order to demonstrate the performance of the jelly in comparison with straight oil addition, two polymer formulations A and B were prepared in substantially identical manner using the following standard recipe wherein the amounts are in parts by weight:

| | Formulation A | Formulation B |
| --- | --- | --- |
| E.P.D.M. | 100 (mixture of 3 E.P.D.M. polymers including 13 p.b.w. Nordel 1500) | 87 (as in A but excluding the 13 p.b.w. Nordel 1500) |
| Poly-XN155 | 120 | — |
| 90/10 Jelly (prepared as above) | — | 133 |
| ZnO | 5 | 5 |
| Stearic acid | 1.5 | 1.5 |
| Carbon black | 200 | 200 |
| Sulphur | 1.5 | 1.5 |
| Mixture of accelerators and vulcanising agents | 3.9 | 3.9 |

(POLY-X and NORDEL are Registered Trade Marks)

All the ingredients except the polymers were placed in a laboratory mixer and mixed for one minute, after which time the polymer was added. The total mixing time was three minutes. In order to simulate poor mixing conditions the ram pressure was reduced from the normal 80 p.s.i. to 10 p.s.i. The formulation (B) prepared in accordance with the present invention, showed superior dispersion and Rheographs to those of formulation (A) which was prepared by simply adding the oil in the usual manner. After vulcanising, the two compositions had the following properties.

|  | A. | B. |
|---|---|---|
| Tensile Strength (p.s.i.) | 1240 | 1380 |
| (kg/cm$^2$) | 87 | 97 |
| Modulus at 300% Elongation |  |  |
| (p.s.i.) | 960 | 950 |
| (kg/cm$^2$) | 67 | 66 |
| Elongation at Break (%) | 415 | 475 |
| Hardness (I.R.H.D.) | 70.5 | 72.0 |

The improvement in the properties of the vulcanizate prepared in accordance with the present invention (B) over the prior art vulcanizate is self-evident.

EXAMPLE 2

90 parts by weight of POLY-XN155 were heated to 110°C. together with 10 p.b.w. of granulated Nordel 1560 in a sigma blade mixer until a clear homogeneous fluid was formed. The fluid was cast into grease-proof cartons and cooled to form a tough rubbery jelly.

In order to compare the performance of the jelly prepared in this way with that of straight oil addition the same composition was prepared in four ways, twice with jelly using a 3 minute and a 6 minute mixing cycle and twice with oil addition using the same mixing cycles. The composition prepared in this way was as follows:

|  | parts by weight |
|---|---|
| Base polymer (E.P.D.M. Nordel 1635) | 100 |
| Zinc Oxide | 5 |
| Stearic Acid | 0.5 |
| Carbon Black | 225 |
| Process Oil | 140 |
| Sulphur | 1.5 |
| Mixture of accelerators and vulcanizing agents | 3.9 |

Mixing was carried out by adding the polymer to the other components (pre-mixed) in a B. R. Banbury mixer set on speed 4 (240 r.p.m.) at an initial temperature of 40°C. and with water heating supplied to the jacket and rotors.

The resulting compositions were tested and the results obtained are shown in Table 4.

The improvement in properties brought about by using jelly as an alternative to the loose oil with the six minute cycle is significant. However, when the cycle time is reduced by 50 percent to 3 minutes, the properties of the loose oil compound are reduced further, whereas those of the jelly compound remain substantially unchanged. The 8.1 percent increase in tensile strength when changing from loose oil to jelly for the six minutes cycle is increased to 24 percent when the mixing cycle is halved.

TABLE 4

| Compound Variables - p.b.w. | | | | |
|---|---|---|---|---|
| Base Polymer | 100 | 84.4 | 100 | 84.4 |
| Poly-XN155 process oil | 140 | — | 140 | — |
| 10% Jelly | — | 155.6 | — | 155.6 |
| Mixing cycle time (mins.) | 6 | 6 | 3 | 3 |
| Mooney Viscosity ML1+4 100°C. | 77 | 86 | 51 | 83 |
| Monsanto Rheographs (160°C. and micro dies at Arc ± 1°) | | | | |
| Minimum Torque (in.lb) | 7.5 | 8.0 | 8.0 | 8.5 |
| Time to 2 in. lb. rise above minimum (mins) | 2.4 | 2.4 | 2.5 | 2.4 |
| Torque at 24 mins. (in.lb.) | 32 | 34 | 32.5 | 34 |
| Press Cure : 28 mins. at 160°C. | | | | |
| Tensile Strength (p.s.i.) | 1480 | 1600 | 1360 | 1690 |
| (kg/cm$^2$) | 104 | 112 | 96 | 119 |
| Modulus at 200% Elongation (p.s.i.) | 1370 | 1470 | — | 1490 |
| (kg/cm$^2$) | 96 | 103 | — | 105 |
| Elongation at Break % | 240 | 220 | 190 | 240 |
| Hardness (I.R.H.D.) | 84 | 86 | 82 | 86 |

We claim:
1. An oil-based composition in the form of a castable jelly comprising a substantially homogeneous blend of from 85 to 95 percent by weight of a mineral oil extender and from 5 to 15 percent by weight of a thermoelastic copolymer of ethylene, propylene and a diene monomer having an ethylene content between 60 and 90 percent by weight, a propylene content between 10 and 35 percent by weight and having a crystallinity of at least 12 percent.

2. A composition according to claim 1 wherein the copolymer has a crystallinity of from 12 to 25 percent.

3. A composition according to claim 2 wherein the copolymer has a crystallinity of from 17 to 25 percent.

4. A composition according to claim 1 wherein the copolymer has a propylene content below 25 percent and an ethylene content above 75 percent.

5. A composition according to claim 1 wherein the copolymer has a modulus greater than 200 p.s.i. at 100 percent elongation and an elongation less than 600 percent at 600 p.s.i. modulus.

6. A composition according to claim 1 wherein the mineral oil extender is a naphthenic petroleum oil.

7. A composition according to claim 1 having a Drop Point of at least 70°C.

8. A composition according to claim 1 having a Penetration Value at 23°C. of from 10 to 200.

9. In a method of preparing an oil containing polymer formulation or pre-dispersion for polymer compounding wherein oil and a copolymer of ethylene, propylene and a diene monomer comprise a part of the polymer formulation or pre-dispersion, the improvement comprising adding an oil based composition as defined in claim 1 to said polymer formulation or pre-dispersion as a source of all or a part of the oil required, and mixing said oil based composition with the other ingredients of the polymer formulation or pre-dispersion.

10. The method of claim 9 wherein at least a part of the ingredients of the polymer formulation or pre-dispersion comprises conventional compounding ingredients selected from the group consisting of antioxidants, activators, accelerators and vulcanizing agents.

11. An oil containing polymer formulation or pre-dispersion whenever prepared by the method according to claim 9.

* * * * *